(12) United States Patent
Block et al.

(10) Patent No.: US 7,716,076 B1
(45) Date of Patent: May 11, 2010

(54) SYSTEM AND METHOD FOR FINANCING AN INSURANCE TRANSACTION

(75) Inventors: Robert J. Block, Chicago, IL (US); Andrew Carter, Glen Ellyn, IL (US)

(73) Assignee: Ocean Tomo, LLC, Chicago, IL (US)

( * ) Notice: Subject to any disclaimer, the term of this patent is extended or adjusted under 35 U.S.C. 154(b) by 1534 days.

(21) Appl. No.: 11/023,048

(22) Filed: Dec. 27, 2004

(51) Int. Cl.
*G06Q 40/00* (2006.01)
(52) U.S. Cl. .......................................................... 705/4
(58) Field of Classification Search ....................... 709/4
See application file for complete search history.

(56) References Cited

U.S. PATENT DOCUMENTS

| | | | | |
|---|---|---|---|---|
| 5,806,042 | A | * | 9/1998 | Kelly et al. ............... 705/4 |
| 6,018,714 | A | * | 1/2000 | Risen et al. ............... 705/4 |
| 7,343,306 | B1 | * | 3/2008 | Bates et al. ............... 705/4 |
| 2001/0042034 | A1 | * | 11/2001 | Elliott ..................... 705/35 |

OTHER PUBLICATIONS

Royalty methods for intellectual property Glenn DeSouza. Business Economics. Washington:Apr. 1997. vol. 32, Iss. 2, p. 46-52 (7 pp.).*
Licensing nightmare Lynnette Luna. Telephony. Chicago:Nov. 20, 2000. vol. 239, Iss. 21, p. 76-78 (2 pp.).*
A licensing revolution Managing Intellectual Property. London:Apr. 2007. p. 1.*

* cited by examiner

*Primary Examiner*—Alexander Kalinowski
*Assistant Examiner*—Muriel Tinkler
(74) *Attorney, Agent, or Firm*—Knobbe Martens Olson & Bear LLP

(57) ABSTRACT

A method for structuring an insurance transaction. The method includes providing insurance coverage to reimburse an insured entity in the event that the insured entity incurs a loss based on the occurrence of one or more defined events, designating an insurance premium amount to be paid by the insured entity as an insurance premium. The method further includes requiring that the insurance premium amount be paid, at least in part, by a transfer of intellectual property assets, each intellectual property asset including a plurality of intellectual property rights.

30 Claims, 4 Drawing Sheets

SYSTEM AND METHOD FOR FINANCING AN INSURANCE TRANSACTION

BACKGROUND

The present application relates to systems and methods of financing an insurance transaction. In particular, the present application relates to systems and methods for financing an insurance transaction using a combination of cash payments and intellectual property assets.

An insurance transaction typically involves obtaining protection to compensate the insured if a specified event occurs. Common examples include auto, home, health and life insurances. Each type of insurance typically provides compensation to the insured in the event of a predefined event, such as an accident or theft in the case of automobile insurance. In most cases, the insurance premium is determined based on the probability that the event will occur and the compensation amount that will need to be provided if the event occurs.

Although insurance is most frequently obtained for assets such as a home, an automobile, health, etc., insurance may also be obtained for many other types of assets and events. In general, insurance is available whenever there is some risk of loss that an insured wants to protect against. For example, a company may wish to insure against the risk that a court will award a claim against them in a legal matter.

In return for the promise of compensation if the specified event occurs, the insured usually pays an insurance premium to the insurer. The insurance premium is generally a cash payment made on a periodic basis. The amount of the insurance premium is generally set by the insurer according to the probability and magnitude of risk being assumed by the insurer. For example, for a loss that is not very likely to occur and/or is not very expensive, the insurance premium may be low, while the insurance premium may be much higher for a loss that is very expensive and is likely to occur.

As stated above, one type of loss that a corporation may be likely to incur is a loss or expense related to a lawsuit. One type of legal loss or expense that may occur is a loss associated with an intellectual property lawsuit. Other examples may include losses associated with environmental or mass tort matters. These types of losses may be exceedingly expensive and, at least in some industries, also relatively likely to occur. When these factors combine (i.e., high magnitude of loss coupled with high probability of loss), insurance may be not only expensive but very difficult or impossible to obtain. If insurance can be obtained and normal assets are used to pay the insurance premiums, the amount of cash or other assets consumed may be considerable.

What is needed is a system and method for structuring an insurance transaction to provide protection against a loss. What is further needed is a system and method for protecting against a loss related to an intellectual property lawsuit, as well as to increase the availability of such protection. What is yet further needed is such a system and method configured to utilize intellectual property assets to finance the insurance premium associated with the protection.

SUMMARY

One exemplary embodiment relates to a method for structuring an insurance transaction. The method includes providing insurance coverage to reimburse an insured entity in the event that the insured entity incurs a loss based on the occurrence of one or more defined events, designating an insurance premium amount to be paid by the insured entity as an insurance premium, and requiring that the insurance premium amount be paid, at least in part, by a transfer of intellectual property assets, each intellectual property asset including at least one intellectual property right.

Another exemplary embodiment relates to q system for generating an insurance agreement. The system includes an input device configured to receive insurance coverage information including an insurance coverage amount to reimburse an insured entity in the event that the insured entity incurs a loss based on the occurrence of one or more defined events and a processor configured to determine an insurance premium amount to be paid by the insured entity as an insurance premium, wherein the insurance premium amount is to be paid, at least in part, by a transfer of intellectual property assets, each intellectual property asset including at least one intellectual property right. The system further includes an output device configured to generate an insurance agreement including the insurance coverage amount and the insurance premium amount, wherein the insurance premium amount includes the first portion and the second portion.

Yet another exemplary embodiment relates to a method for generating value from intellectual property assets. The method includes providing insurance coverage to reimburse an insured entity in the event that the insured entity incurs a loss based on the occurrence of one or more defined events, designating an insurance premium amount to be paid by the insured entity as an insurance premium, and requiring that at least a portion of the insurance premium amount be paid by a transfer of intellectual property assets, each intellectual property asset including at least one intellectual property right, and licensing at least a portion of the intellectual property rights associated with the intellectual property assets back to the insured entity in exchange for one or more payments under a variable royalty rate.

DETAILED DESCRIPTION OF THE PREFERRED EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

In at least one exemplary embodiment illustrated below, a computer system is provided which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, multiple workstations, databases, processes, or computers can be utilized. In yet other embodiments, hardwired circuitry may be used in place of, or in combination with, software instructions to implement the functions described. Thus, the embodiments described herein are not limited to any particular source for the instructions executed by the computer system.

Figure 1:
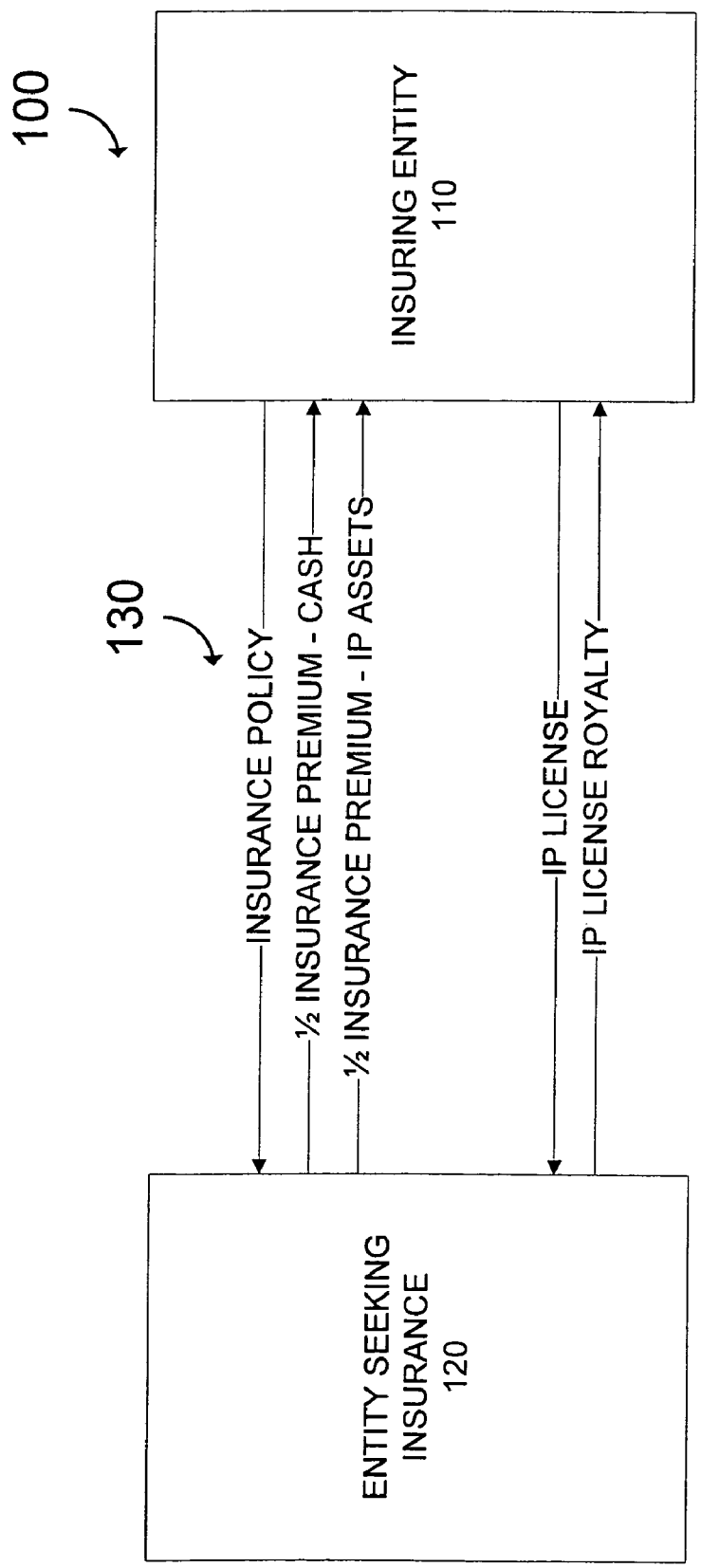
FIG. 1 is a block diagram illustrating a system and method for structuring an insurance transaction using intellectual property, at least in part, to finance insurance premiums for the insurance transaction, according to an exemplary embodiment.

Referring now to FIG. 1, a block diagram 100 illustrates an exemplary embodiment of a system and method for structuring an insurance transaction using intellectual property (IP), at least in part, to finance insurance premiums for the insurance transaction. Block diagram 100 illustrates the transaction as occurring between an insuring entity 110 and an insured entity 120 that owns one or more IP assets.

Insured entity 120 may be any type of entity that owns or owns rights in one or more IP assets. For example, insured entity 120 may be a corporation, a partnership, an individual, etc.

The ownership of the one or more IP assets by insured entity 120 may be ownership based on creation, for example where a person within insured entity 120 creates an invention and obtains a patent directed to the invention or creates an original work and obtains a copyright. Alternatively, ownership may be the result of an acquisition of an IP asset originally owned by another entity. Further, ownership may be based on an acquisition by licensing of an IP asset owned by another. Yet further, the ownership may be ownership in whole or in part. Ownership of an IP asset can include any type of ownership that confers the right to exercise one or more IP rights associated with the IP asset.

Examples of IF assets may include patents, copyrights, trade secrets, trademarks, etc. Patents entitle the owner to exclude others from practicing the invention covered by the claims in the patent. Another type of intellectual property is information described in writings and knowledge arising within a business which is: (a) not generally known by others; (b) retained in secret, and (c) disclosed to others only under an obligation of confidentiality (hereinafter referred to as "trade secrets" or "know how"). Copyrights are another form of IP that may be securitized. Copyrights provide authors with the right to control reproduction of their original intellectual creations, such as literary works, musical works, dramatic works, pictorial works, motion pictures, sound recordings and architectural works.

A characteristic of all such intellectual property assets is the right to license, lease, or otherwise convey rights to others to use or otherwise practice the useful art, in whole or in part, embodied in such intellectual properties (hereinafter referred to as "licensing"). The licensing of these rights to a third party may be made in return for some type of compensation, such as royalty payments. A further characteristic of intellectual property assets is the right to identify potential infringers of the intellectual property asset and to request or sue for payment of a reasonable royalty rate or other remuneration based on the infringing use.

IP rights can include any right associated with an IP asset. An IP right may be conferred by statute, case law, practice in the industry, inherent properties, etc. An IP right may further include the right to perform an action and/or prevent another party from performing an action. For example, patents entitle the owner to exclude others from importing, making, using, selling, or offering to sell the invention covered by the patent. Further, copyrights provide authors the right to control reproduction of their original intellectual creations, such as literary works, musical works, dramatic works, pictorial works, motion pictures, sound recordings and architectural works, along with the right to make derivative works.

According to an exemplary embodiment, and based on the nature of IP assets, it is often possible to license IP rights arising from the same IP asset or group of IP assets to two or more entities simultaneously. For example, as stated above, a patent generally includes a right to exclude others from practicing the invention. Inherent in the right to exclude is the right to license particular entities to practice the invention, usually in return for compensation, such as licensing fees. Further, different types of licenses may be granted such as an exclusive license, a non-exclusive license, an exclusive license within a defined field of use, etc. Whenever a license to one entity is other than an exclusive license to all fields of use for the entire economic life of the underlying IP asset, residual rights in the IP asset are created and may be licensed to other entities. Thus, a residual portion of an IP asset includes a right under the IP asset that is less than all of the rights afforded by the IP asset.

With the foregoing in mind, it is evident that insured entity 120 may not be fully utilizing the IP rights afforded under one or more IP assets. For example, where insured entity 120 is a vehicle manufacturer that owns a patent directed to a method of spray painting, the vehicle manufacture may only be utilizing the patented method of spray painting as applied to vehicles. Accordingly, the only portion of the IP rights that the vehicle manufacture needs to practice its trade is the right to spray paint vehicles under the patent, despite that the patented method may be useful for objects other than vehicles. In this situation, the unused portion of the IP rights is simply wasted in the sense that it may have economic value to others but is not being exploited.

The foregoing situation arises whenever the patent rights owned by one party (e.g., insured entity 120) are broader than what it needs to practice its trade. In the example provided above, the spray painting method being used by the vehicle manufacturer to spray paint vehicles may be broad enough to cover and would also work well for spray painting houses. In this example, the portion of the EP rights not being used by the vehicle manufacture may be referred to as a residual portion. The residual portion may not be utilized by the vehicle manufacturer because the manufacturer may have no interest in preventing others from using this method to spray paint houses. The IP right residual portion may include numerous residual portions delineated by field of use, term of use, geographic location of use, etc.

Further, a company may own IP assets that are non-core IP assets. That is, the subject matter of the IP assets may not be aligned with the focus of the company's business strategy. In these situations, the company may not currently be using any of the IP rights associated with the non-core IP assets.

The residual portion of the IP rights or the IP rights associated with non-core IP assets, although not valuable to the insured entity 120 in its present business, may be valuable to another entity in a different business. To continue the example from above, a house painting entity may be interested in utilizing the residual portion of the spray painting IP asset. In particular, the house painting entity may desire to license one or more IP rights in the residual portion of the IP asset for painting houses. Further, there may be infringers of the residual portion of the IP asset. As such, it may be possible to obtain reasonable royalties based on the infringing use of residual rights by the infringers.

However, insured entity 120 may not possess the resources or knowledge required to capture the potential income that may be generated based on the residual portion of the IP rights or the non-core IP rights. For example, patent litigation is a costly venture and a relatively small target entity may not have the resources to warrant pursuing this course of action, or they may not wish to dedicate the resources to the course of action, especially against an entity that is not a competitor. Further, licensing revenue can only be generated if the insured entity 120 is able to identify potential licensees. Identifying potential licensees may require in depth analysis of IP rights and markets where the IP rights may be of value. This type of analysis may require a diverse and specialized knowledge base.

According to an exemplary embodiment, insured entity 120 may desire to obtain insurance from insuring entity 110 to protect itself against the possibility of incurring some loss based on a defined event. Accordingly, insured entity 120 may enter into an insurance transaction 130 with insuring entity 110. In the insurance transaction, insuring entity 110 agrees to cover insured entity 120 against loss in the event that the defined event occurs. Insuring entity 110 may agree to provide this insurance against loss in exchange for an amount designated as an insurance premium to be paid by insured entity 120. To pay the insurance premiums, insured entity 120 may desired to utilize one or more IP assets in an IP financed insurance transaction, further discussed below in FIG. 2.

For example, insured entity 120 may wish to obtain $100 million in insurance from insuring entity 110 to protect itself against any losses that may occur based on claims of patent infringement. In exchange for providing this $100 million in insurance, insuring entity 110 may require $6 million in insurance premiums to be paid by insured entity 120. Insured entity 120 may pay the insurance premium as $3 million in cash, and $3 million in transfer of IP assets having a total fair market value of $3 million.

According to an exemplary embodiment, the insurance transaction may further be configured so that insuring entity 110 licenses some or all of the IP rights associated with the transferred IP assets back to the insured entity 120 in exchange for royalty payments, as further discussed below with reference to FIG. 3. The insurance transaction may further be structured such that the royalty payments have a variable rate based on various factors such as claims history, out-licensing history, etc. For example, the royalty payments may be offset by licensing revenue generated by insuring entity 110 in licensing non-core IP assets or residual portions of IP assets to third parties, as will be further discussed below with reference to FIG. 4. As another example, the royalty payments may start out very low (or be completely absent), and then increase substantially (or begin if previously nonexistent) only after an insurance claim has been paid out, as will also be further discussed below.

Figure 2:
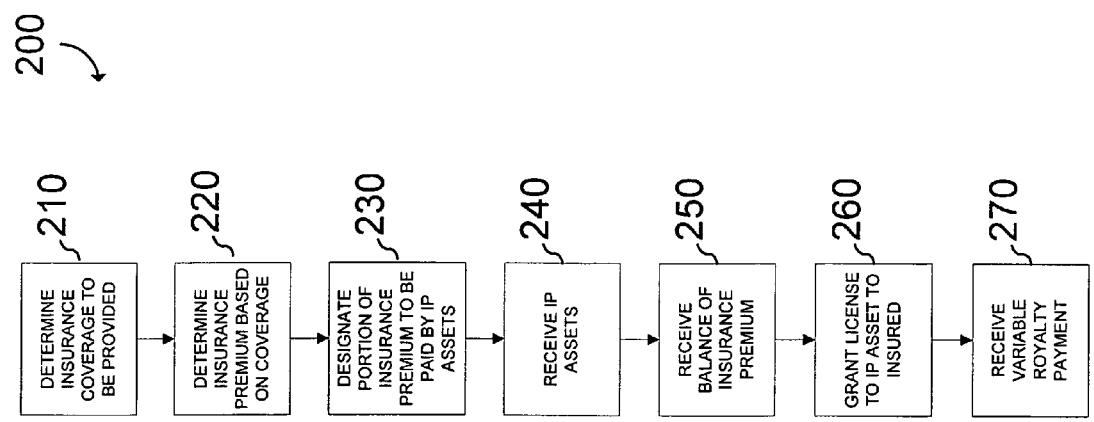
FIG. 2 is a flowchart illustrating a method for creating an IP financed insurance transaction, according to an exemplary embodiment.

Referring now to FIG. 2, a flowchart 200 illustrating an exemplary embodiment of a method for creating an IP financed insurance transaction is shown. The method may be implemented, in whole or in part, by a computer system configured to receive one or more inputs, perform the steps of the method, and generate an IP financed insurance transaction agreement. Further, according to alternative embodiments, the method may include more, fewer, or a different ordering of the steps described herein.

In a step 210, a determination is made regarding what amount of coverage insured entity 120 will provide to insuring entity 110. The amount of coverage to be provided may be determined based on typical award amounts for the industry, the technology, known exposures to risks, etc. By way of example, insured entity 120 may wish to obtain $100 million in insurance based on damages awards that were issued against several competitors in the same industry in a recent period.

In a step 220, an insurance premium amount may be determined based on the amount of insurance coverage to be provided and the probability that a claim against the insurance amount will occur. The probability that a claim will occur may be based on acquired expert knowledge of the field and/or other considerations (e.g., actuarial tables, statistics, etc.).

The insurance transaction may be structured such that the insurance premium is paid, at least in part, by the transfer of one or more IP assets or some portion of one or more IP assets from the insured entity 120 to the insuring entity 110 in a step 230. According to an exemplary embodiment, the transferred IP assets may include residual IP assets and/or non-core IP assets, as discussed above with reference to FIG. 1. The transfer of IP assets may also include transfer of dedicated holding company stock representing the non-core and/or residual IP assets.

In order to begin the process, at least one IP asset must be identified. Generally, an owner of an IP asset that wishes to purchase insurance using some portion of its IP portfolio will identify all IP assets it owns, and determine which one or ones it desires to have analyzed for insurance premium payment. Often, the owner will want to utilize all of the IP assets it owns that relate to a particular product line or business activity. The IP portfolio may even contain IP assets owned by third parties, so long as the owner seeking monetization has rights in such third party IP assets, and the right to convey such rights to others.

Once a particular IP portfolio is identified, its current fair market value must be determined to an acceptable degree of accuracy for purposes of determining the amount of insurance premiums to be offset by the IP asset, further described below. There are a number of different approaches to determining fair market value of IP assets, and different methods may produce different estimated values. One exemplary method for IP asset valuation is described in U.S. Patent Application No. 20010042034, filed Jan. 11, 2001.

To effectively utilize an IP asset, an economically reasonable estimate of the current value of the IP asset must be obtained as described above. Further, the ability to demonstrate to a current owner the value of an IP asset for which the owner is seeking securitization is useful. While numerous methods of estimating the value of one or more IP assets are known, one embodiment of the present invention includes a method of combining an estimate of the value of an IP asset with an assessment of the impact on the value of the selling business of utilizing that IP asset. This method comprises receiving information related to at least one IP asset, calculating a value of the at least one IF asset using a first valuation algorithm, selecting a second valuation algorithm having a plurality of inputs, inputting the value of at least one IP asset into the second valuation algorithm, inputting at least one additional piece of information required by the second valuation algorithm, and calculating the change in value to the owner of the IP asset using the second valuation algorithm. The method may further comprise inputting an identifier indicative of a utility of the IP asset by selecting from a list including such options as: "new product category," "improvement on an existing product," "a new process," "an improvement on an existing process," and "regulatory compliance." The method may further comprise selecting a first valuation algorithm from a plurality of valuation algorithms by selecting a first valuation algorithm particular to the type of utility associated with the IP asset. The method may further comprise receiving information on the financial characteristics of the owner not directly related to the IP asset.

Typical information used for the valuation method of this embodiment includes, but is not limited to: current and projected future revenues and costs of the goods covered by the IP asset, cost savings attributable to an invention covered by an IP asset, the book value of the business activities associated with the IP asset, and ongoing expenditures for marketing, research and development. As will be appreciated, it can be difficult to calculate a value for an IP asset that is not associated with any current or ongoing revenues or costs.

The particular valuation algorithm used will determine what information must be obtained regarding the IP asset and entered for the valuation to be completed. For example, when making a valuation for a patent covering an environmental control invention that permits a business to continue operation under regulatory requirements, the evaluation should take into consideration the ongoing revenue generated by the continuation of the business. In addition to financial information, information such as the remaining life of the patent may be used by the first valuation algorithm.

Once the appropriate first valuation algorithm has been determined for each IP asset within a portfolio, the current value of the portfolio is determined using the appropriate algorithms.

The valuation may be utilized in the acquisition of the IP assets by insuring entity 110 as at least partial payment of the insurance premium in a step 240. For example, if the insurance premium for a $100 million insurance policy for three years is $6 million, IP assets may be utilized to offset $3 million of the insurance premiums, leaving a balance of $3 million. The remainder of the insurance premium may be paid in cash or some other form of capital in a step 250. In some instances the payment of the insurance premiums may be a fully deductible expense, thus allowing the insured entity to realize a tax benefit during payment of the premiums.

According to an alternative embodiment, the insurance transaction may include additional layers of insurance according to various methods and structures. For example, the insurance transaction may include one or more insurance coverage amounts configured to be paid after the insurance coverage described above has been exhausted. The additional insurance coverage layers may include standard insurance premium payment structures. The additional insurance coverage may further include any type of insurance coverage structure, such as a captive insurance structure wherein the insuring entity is owned by the insured entity.

The insurance transaction may further require that the insuring entity 110 grant a license to practice the IP assets back to the insured party 110 in a step 260 in exchange for receiving payment of a variable royalty in a step 270. A variable royalty may be a royalty rate that is tied to an external factor. Following the transfer of ownership of the IP assets from insured entity 120 to insuring entity 110 as partial payment of the insurance premium, insuring entity 110 may license a first portion of the IP right back to insured entity 120 such that insured entity 120 may continue to exercise the rights it needs to practice its trade. Generally, the license will allow insured entity 120 to exercise the IP right for the duration of a license term associated with the IP assets.

As explained above, the royalty payments paid in step 270 may be variable royalty payments based on external factors. For example, the royalty payments may be configured such that the amount of the royalty is dependent on the amount that is paid out in claims by the insuring entity 110. The royalty payment may be structured such that the royalty payments will be equivalent to the value paid out in claims plus a return of capital fee over the remaining portion of the license term. A system and method for determining the variable royalty rate is described below with reference to FIG. 3.

Figure 3:
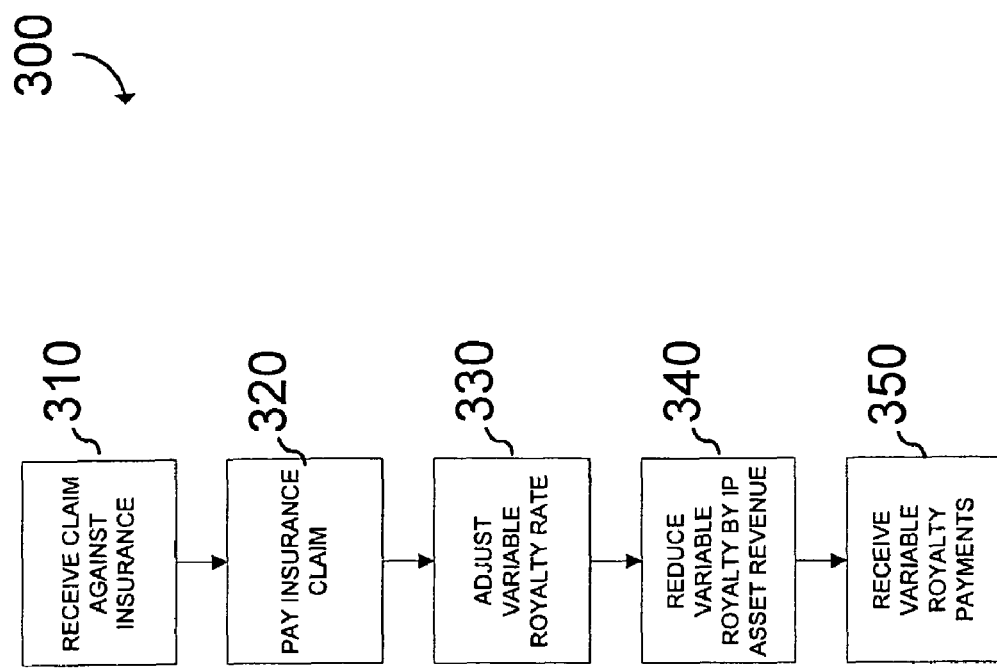
FIG. 3 is a flowchart illustrating a method for determining a reasonable royalty rate for an IP asset license in an insurance transaction, according to an exemplary embodiment.

Referring now to FIG. 3, a flowchart 300 illustrates an exemplary embodiment of a method for determining a reasonable royalty rate for an IP asset license in an insurance transaction. The method may be configured such that the method may be partially or entirely performed by a computer. Further, although specific steps are described in a specific order, alternative methods may be used that have more, fewer, and/or a different ordering of steps to perform the functions described herein.

In the insurance transaction described above with reference to FIG. 2, the insurance transaction includes a license of IP rights from insuring entity 110 to insured entity 120 in exchange for payment of a variable royalty by insured entity 120. According to an exemplary embodiment, the variable royalty may initially be set to a nominal value, including zero.

In a step 310, insured entity 120 may file a claim against the insurance coverage. The claim may be any amount up to the maximum amount of insurance coverage provided in the insurance transaction. The claim amount may be paid by the insuring entity 110 to the insured entity 120 in a step 320. In some instances, the amount paid under the insurance claim may also receive favorable tax treatment such that the amount recovered by the insured entity is not taxed.

Following receipt of the claim, the variable royalty rate may be adjusted based on the received claim in a step 330. For example, the variable royalty rate may be structured such that the royalty payments will be equivalent to the value paid out in claims plus a return of capital fee over the remaining life of the license of IP rights from insuring entity 110 to insured entity 120.

Following the determination of the variable royalty rate that is to be paid based on received insurance claims in step 330, the variable royalty rate may be further adjusted in a step 340 based on IP asset revenue from out-licensing of the transferred residual and non-core IP assets to third parties. According to an exemplary embodiment, insuring entity 110 may be configured to receive the IP assets received from insured entity 120 along with IP assets from other sources, such as additional insured entities, to form a patent investment entity that owns a pool of such IP assets and is configured to generate IP asset revenue based on the pool. Revenue may be generated based on licensing to third parties, litigation, etc. The royalty payments are received and recorded in a step 350.

Figure 4:
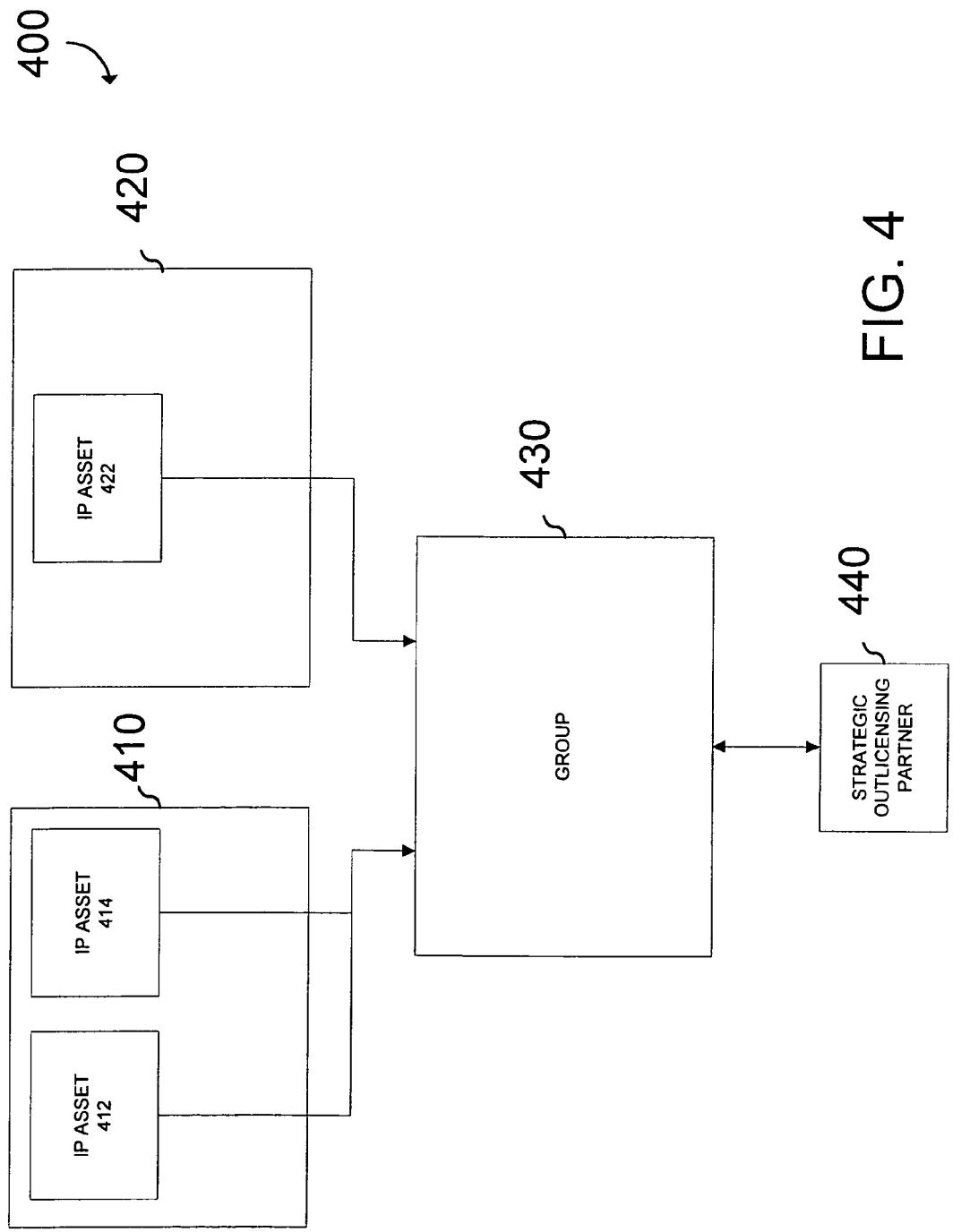
FIG. 4 is a block diagram illustrating a patent investment entity contributing a first intellectual property asset and a second intellectual property asset to a grouping of intellectual property assets, according to an exemplary embodiment.

Referring now to FIG. 4, a block diagram 400 illustrating a patent investment entity 410 contributing a first IP asset 412 and a second IP asset 414 to a grouping 430. One or more entities may contribute additional IP assets to grouping 430. For example, second patent investment entity 420 is illustrated contributing a third IP asset 422 to grouping 430. This same structure may be used to create additional patent groupings. Each patent grouping may be associated with a specific strategic out-licensing partner 440, as further described below.

As explained above, the IP assets obtained from insured entity 120, shown in FIG. 1, may further be grouped with other IP rights associated with other IP assets. According to an exemplary embodiment, grouping 430 may be a grouping of rights associated with intellectual property assets from insuring entity 110. Grouping 430 may further include rights acquired from sources other than insured entity 120.

Advantageously, grouping 430 of portions of IP rights allows insuring entity 110 to create value from of the residual portions that would otherwise be wasted. The residual portions in grouping 430 may be acquired based on at least one common characteristic of the residual portions. The common characteristic may include a technology area, a typical usage, a specific industry, etc.

Grouping 430 of patent rights may facilitate economies of scale in the exercise of patent rights. For example, insuring entity 110 is specifically configured for the exercise of patent rights. Accordingly, insuring entity 110 may have greater resources and/or more experience at obtaining income based on the residual rights. Such income may be obtained by identifying potential licensees, pursuing litigation against infringers, etc.

Additionally, grouping 430 may be further structured such that any entity that provided an IP asset used in grouping 430 may be free to practice to operate according to any other IP asset in grouping 430. This benefit may be provided through licenses, covenants not to sue, etc.

For example, multiple residual portions may be grouped related to a single technology to strengthen a licensing bargaining position of insuring entity 110. When approaching a potential licensee, it may be advantageous be able to offer licenses to multiple residual portions within the potential licensee's field of operations. Advantageously, obtaining a single license has the effect of streamlining infringement avoidance for the potential licensee.

Grouping residual portions of IP rights may further facilitate recognition of additional opportunities to obtain IP assets. For example, it may be possible to identify a new IP asset based on the grouping of the residual portions and to obtain the IP asset based on the identification. For example, where the claims of two patents, viewed in concert, define a gap and identify a novel concept, a new patent application, or bridge patent, may be filed based on the novel concept.

Further each group 430 may be associated with strategic out-licensing partner 440. Each strategic out licensing partner 440 may be specifically experienced in the area of technology or focus of the group of residual portions. Advantageously, the strategic out-licensing partners 440 may be experienced in the industry and in IP to facilitate identification of potential licensees, identification of bridge patent opportunities, etc.

Referring again to FIG. 3, the revenue that is generated through the grouping of IP assets may be used to offset the amount that insuring entity 110 pays out in insurance claims. Accordingly, the variable royalty rate may be further adjusted based on IP asset revenue in step 340.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for structuring an insurance transaction, comprising:
providing insurance coverage to reimburse an insured entity in the event that the insured entity incurs a loss based on the occurrence of one or more defined events;
using a processor that executes instructions contained in memory to determine an insurance premium amount to be paid by the insured entity as an insurance premium;
requiring that the insurance premium amount be paid, at least in part, by a transfer of intellectual property assets, each intellectual property asset including at least one intellectual property right; and
using a computer system to generate a license agreement for licensing at least a portion of the intellectual property rights associated with the intellectual property assets back to the insured entity in exchange for one or more payments under a variable royalty rate in addition to payments of the insurance premium,
wherein the initial royalty rate is set by the computer system to a nominal value;
wherein the variable royalty rate changes from the nominal value when the insured entity incurs a loss based on the occurrence of the one or more defined events;
wherein the variable royalty rate is determined by the computer system based on the amount that has been paid to the insured entity as claims under the insurance coverage;
wherein the insurance premium amount is set by the insurer according to the probability and magnitude of risk being assumed by the insurer and said insurance premium amount does not increase based on said one or more defined events;
wherein the one or more defined events are related to an intellectual property lawsuit.

2. The method of claim 1, further including requiring that a second portion of the insurance premium amount be paid by other than the transfer of intellectual property assets.

3. The method of claim 2, wherein the second portion of the insurance premium amount to paid by other than a transfer of intellectual property assets is determined based on a calculation of the fair market value of the transferred IP asset.

4. The method of claim 1, wherein the variable royalty rate is set to repay in full the amount paid to the insured entity as claims under the insurance coverage and a return of capital fee.

5. The method of claim 4, wherein the repayment amount is calculated to repay the claim payout plus return of capital over the remaining term of the license.

6. The method of claim 4, further including creating a grouping of intellectual property assets including at least the transferred intellectual property assets.

7. The method of claim 6, further including generating income from the grouping of intellectual property assets.

8. The method of claim 7, further wherein the income is generated by licensing at least part of the grouping of intellectual property assets to third parties.

9. The method of claim 7, wherein the generated income is applied to reduce the variable royalty rate.

10. The method of claim 1, further including providing an additional layer of insurance coverage based on the one or more defined events.

11. The method of claim 10, wherein the additional layer is a captive layer.

12. The method of claim 1, further including creating a grouping of intellectual property assets including at least the transferred intellectual property assets.

13. The method of claim 1, further including generating income based on the transferred intellectual property assets to offset the expense of paying claims under the insurance coverage.

14. A system for generating an insurance agreement, comprising:
an input device within a computer system to receive insurance coverage information including an insurance coverage amount to reimburse an insured entity in the event that the insured entity incurs a loss based on the occurrence of one or more defined events;
a processor that executes instructions contained in memory to determine an insurance premium amount to be paid by the insured entity as an insurance premium,
wherein the insurance premium amount is to be paid, at least in part, by a transfer of intellectual property assets, each intellectual property asset including at least one intellectual property right;
an output device configured to generate an insurance agreement including the insurance coverage amount and the insurance premium amount;
the computer system programmed to generate a license agreement, wherein the license agreement licenses at least a portion of the intellectual property rights associated with the intellectual property assets back to the insured entity in exchange for one or more payments under a variable royalty rate in addition to payments of the insurance premium,
wherein the initial royalty rate is set by the computer system to a nominal value;
wherein the variable royalty rate changes from the nominal value when the insured entity incurs a loss based on the occurrence of the one or more defined events;
wherein the variable royalty rate is determined by the computer system based on the amount that has been paid to the insured entity as claims under the insurance coverage;
wherein the insurance premium amount is set by the insurer according to the probability and magnitude of risk being assumed by the insurer and said insurance premium amount does not increase based on said one or more defined events; and
wherein the one or more defined events are related to an intellectual property lawsuit.

15. The system of claim 14, wherein a second portion of the insurance premium amount is to be paid by other than a transfer of intellectual property assets.

16. The system of clam 15, wherein the amount to paid by other than a transfer of intellectual property assets is determined based on a calculation of the fair market value of the transferred IP asset.

17. The system of claim 14, wherein the processor is further configured to set the variable royalty rate to repay in full the amount paid to the insured entity as claims under the insurance coverage and a return of capital fee.

18. The system of claim 17, wherein the repayment amount is calculated to repay the claim payout plus return of capital over the remaining term of the license.

19. The system of claim 14, wherein the processor is further configured to create a grouping of intellectual property assets including at least the transferred intellectual property assets.

20. The system of claim 19, wherein the processor is further configured to generate income from the grouping of intellectual property assets.

21. The system of claim 20, wherein the processor is further configured to apply the generated income to reduce the variable royalty rate.

22. The system of claim 14, wherein the processor is further configured to generate the insurance agreement to include an additional layer of insurance coverage based on the one or more defined events.

23. The system of claim 22, wherein the additional layer is a captive layer.

24. A method for generating value from intellectual property assets, comprising:
providing insurance coverage to reimburse an insured entity in the event that the insured entity incurs a loss based on the occurrence of one or more defined events;
using a processor that executes instructions contained in memory to determine an insurance premium amount to be paid by the insured entity as an insurance premium;
requiring that the insurance premium amount be paid, at least in part, by a transfer of intellectual property assets, each intellectual property asset including at least one intellectual property right; and
using a computer system to license at least a portion of the intellectual property right associated with the intellectual property assets back to the insured entity in exchange for one or more payments under a variable royalty rate in addition to payments of the insurance premium,
wherein the initial royalty rate is set by the computer system to a nominal value;
wherein the variable royalty rate changes from the nominal value when the insured entity incurs a loss based on the occurrence of the one or more defined events;
wherein the variable royalty rate is determined by the computer system based on the amount that has been paid to the insured entity as claims under the insurance coverage and a return capital fee;
wherein the insurance premium amount is set by the insurer according to the probability and magnitude of risk being assumed by the insurer and said insurance premium amount does not increase based on said one or more defined events;
wherein the one or more defined events are related to an intellectual property lawsuit.

25. The method of claim 24, further including creating a grouping of intellectual property assets including at least the transferred intellectual property assets.

26. The method of claim 25, further including generating income from the grouping of intellectual property assets.

27. The method of claim 26, wherein the generated income is applied to reduce the variable royalty rate.

28. The method of claim 24, further including providing an additional layer of insurance coverage based on the one or more defined events.

29. The method of claim 24, further including creating a grouping of transferred intellectual property assets including at least the transferred intellectual property assets.

30. The method of claim 29, further including generating income based on the transferred intellectual property rights to offset the expense of paying claims under the insurance coverage.

* * * * *

UNITED STATES PATENT AND TRADEMARK OFFICE
CERTIFICATE OF CORRECTION

PATENT NO. : 7,716,076 B1  Page 1 of 1
APPLICATION NO. : 11/023048
DATED : May 11, 2010
INVENTOR(S) : Robert J. Block et al.

It is certified that error appears in the above-identified patent and that said Letters Patent is hereby corrected as shown below:

In Column 3, Line 35, Change "IF" to --IP--.

In Column 4, Line 41, Change "EP" to --IP--.

In Column 6, Line 52, Change "IF" to --IP--.

Signed and Sealed this

Sixteenth Day of November, 2010

David J. Kappos
*Director of the United States Patent and Trademark Office*